Patented Oct. 9, 1928.

1,686,670

UNITED STATES PATENT OFFICE.

HERBERT T. LEO, OF CORONA, CALIFORNIA.

SOLID FLAVORING MATERIAL.

No Drawing. Application filed October 28, 1926. Serial No. 144,913.

This invention relates to solid flavoring material and to a process of making the same from fruit juices. It has heretofore been found possible to produce fruit juices in solid form, as by evaporation, or otherwise, but, in general, fruit powders so made are so very unstable as to be of little commercial value. On account of their hygroscopic nature, such powders cannot be kept, except in air tight containers, without absorbing sufficient moisture from the air to cause them to liquefy.

It is therefore an object of this invention to provide a non-hygroscopic, solid flavoring material possessing the natural flavor of the original fruit.

It is a further object of this invention to provide a solid flavoring substance of excellent keeping qualities that may be used in the baking, confectionery and kindred industries to replace artificial fruit flavors and extracts.

Other and further important objects of this invention will be apparent from the disclosures in the specification and the appended claims.

In general, my process consists in dehydrating an inert food substance capable of crystallizing with water of crystallization as for instance certain of the monosaccharides, and more especially the aldohexose sugars, and combining with the dehydrated substance a fruit juice in place of the water of crystallization. The aldohexose which I prefer to use, both because of its availability and cheapness, is a refined dextrose produced by the hydrolysis of corn starch. Dextrose normally forms crystals containing at least one molecule of water of crystallization for each molecule of dextrose, but under certain conditions dextrose will form solid hydrates in which the crystals are in a magma. The water of crystallization may, however, be driven out by heating the dextrose, preferably to a temperature near its melting point, 146 to 148° C. I take advantage of this fact in preparing solid flavoring materials by the addition of a fruit juice to dehydrated dextrose. The fruit juice is thereby caused to take the place of the water of crystallization, the dextrose crystallizing out with the fruit juice, chemically or physically, combined with the dextrose molecules.

My process, in the preferred form, is illustrated as follows:

About 80 parts of pure dextrose are heated up to near the melting point of the dextrose for a sufficient period to drive off the water of crystallization. The dehydrated dextrose is then allowed to cool to a point where the fruit juice may be added. Various fruit juices, such as orange, lemon or grape may be used. While it is not necessary to concentrate the fruit juices, this is often desirable by evaporation in vacuo. The strength of the juice in flavor, the purpose for which the flavoring material is to be used and other considerations will determine whether or not the fruit juices should be concentrated before adding to the dextrose. Where lemon juice has previously been concentrated 10 to 1, about 20 parts of the concentrated juice are added to the dehydrated dextrose. The mass is well mixed and set aside to cool. The speed of the crystallizing action may be increased by adding crystals of dextrose to the mass, which will eventually set into a solid homogeneous body entirely free of liquid. Ordinarily no evaporation will take place or is necessary to effect the crystallization process. After hardening, the mass may be shaved into chips or ground into a white granular powder.

Since dextrose is soluble in water up to 81 parts in a 100, it is only necessary in using my solid flavoring material to add sufficient water to dissolve the flavoring material. The solution so prepared retains the original natural flavor of the fruit and can be used in all places where fruit juices or extracts are required. Obviously, it is not always necessary to redissolve the solid flavoring material since in many operations the powdered solid may be used directly. On account of its excellent keeping qualities, the solid flavoring material may be shipped and stored for indefinite periods without loss of strength or danger of spoiling. The powder has no tendency to absorb moisture from the air and therefore need not be kept in moisture proof containers.

It will be appreciated that various proportions of dextrose to fruit juice may be used, the important requirement being that the proportion is such as to produce a solid product free of liquid. The proportions will naturally vary with the different fruits and in accordance with the condition of the fruit at the time of using.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. A non-hygroscopic substance comprising substantially pure crystalline dextrose having the natural flavor of a fruit.

2. The process of making solid flavoring material, which comprises crystallizing dextrose with a fruit juice to obtain a solid free of liquid.

3. The process of making solid flavoring material, which comprises dehydrating dextrose containing water of crystallization and replacing said water of crystallization with a fruit juice.

4. The process of making solid flavoring material, which comprises heating dextrose until the water of crystallization is expelled, adding a fruit juice to the dehydrated dextrose and allowing the mass so formed to harden into a solid, free of liquid and non-hygroscopic.

5. A solid flavoring material, comprising a monosaccharide, the molecules of which are normally capable of crystallizing with water of crystallization, and a concentrated fruit juice replacing said water of crystallization in the monosaccharide molecule.

6. A solid flavoring material, comprising crystalline dextrose containing lemon juice in combination therewith.

7. A solid edible product, consisting of crystalline dextrose hydrate containing a fruit component in its water of crystallization.

In testimony whereof I have hereunto subscribed my name.

HERBERT T. LEO.